US012547198B2

(12) United States Patent
Lien et al.

(10) Patent No.: US 12,547,198 B2

(45) Date of Patent: Feb. 10, 2026

(54) VOLTAGE REFERENCE CIRCUIT BASED ON TEMPERATURE-SENSITIVE DEVICES HAVING OPPOSITE TEMPERATURE COEFFICIENTS

(71) Applicant: TAIWAN SEMICONDUCTOR MANUFACTURING COMPANY, LTD., Hsinchu (TW)

(72) Inventors: Bei-Shing Lien, Hsinchu (TW); Szu-Lin Liu, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 204 days.

(21) Appl. No.: 18/480,983

(22) Filed: Oct. 4, 2023

(65) Prior Publication Data

US 2024/0338044 A1 Oct. 10, 2024

Related U.S. Application Data

(60) Provisional application No. 63/502,759, filed on May 17, 2023, provisional application No. 63/495,192, filed on Apr. 10, 2023.

(51) Int. Cl.

*G05F 1/565* (2006.01)

*G05F 1/575* (2006.01)

(Continued)

(52) U.S. Cl.

CPC .............. *G05F 3/245* (2013.01); *G05F 1/565* (2013.01); *G05F 1/575* (2013.01); *G05F 3/262* (2013.01)

(58) Field of Classification Search

CPC ..... G05F 3/10; G05F 3/16; G05F 3/18; G05F 3/185; G05F 3/20; G05F 3/26; G05F 3/30;

(Continued)

(56) References Cited

U.S. PATENT DOCUMENTS 7,863,884 B1 * 1/2011 Carper ...................... G05F 3/30 323/316

8,040,118 B2 * 10/2011 Cho ........................ G05F 1/565 323/275

(Continued)

FOREIGN PATENT DOCUMENTS

CN 111831044 10/2020

CN 112433556 3/2021

(Continued)

OTHER PUBLICATIONS

English Translation of JP 2017-126280 (Year: 2017).*

*Primary Examiner* — Sean Kayes

*Assistant Examiner* — Nusrat Quddus

(74) *Attorney, Agent, or Firm* — Hauptman Ham, LLP

(57) ABSTRACT

An integrated circuit includes a first temperature-sensitive device configured to generate a first voltage, a second temperature-sensitive device configured to generate a second voltage, and an output terminal configured to generate a reference voltage which is a summation of the first voltage and the second voltage. The first voltage monotonically increases with an absolute temperature. The second voltage monotonically decreases with the absolute temperature. In the integrated circuit, a low-dropout regulator has a first input connected to the output terminal and an output connected to the gate of a power regulating transistor. The channel of the power regulating transistor is connected between a first terminal configured to receive a first supply voltage and a second terminal configured to generate a second supply voltage.

20 Claims, 9 Drawing Sheets

(51) Int. Cl.
*G05F 3/24* (2006.01)
*G05F 3/26* (2006.01)

(58) Field of Classification Search
CPC ... G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/463; G05F 1/468; G05F 1/46; G05F 1/461; G05F 1/575; G05F 1/465; G05F 1/462; G05F 1/56; G05F 1/562; G05F 1/565; G05F 1/567; G05F 1/569; G05F 1/571; G05F 1/573; G05F 1/5735
See application file for complete search history.

(56) References Cited

U.S. PATENT DOCUMENTS

| | | | | |
|---|---|---|---|---|
| 8,405,376 | B2 * | 3/2013 | Hwang | G05F 3/16 323/907 |
| 9,218,016 | B2 * | 12/2015 | Pan | G05F 3/242 |
| 9,325,325 | B2 * | 4/2016 | Gailhard | H03L 1/026 |
| 9,857,814 | B2 * | 1/2018 | Cohen | G01K 7/00 |
| 11,320,319 | B2 * | 5/2022 | Bucur | H03K 17/14 |
| 11,392,156 | B2 * | 7/2022 | Elwan | G05F 1/463 |
| 11,829,171 | B1 * | 11/2023 | Abbasi | G05F 3/267 |
| 11,835,399 | B2 * | 12/2023 | Tsukamoto | G05F 3/225 |
| 12,235,666 | B2 * | 2/2025 | Tiruvamattur | G05F 1/567 |
| 2008/0218253 | A1 * | 9/2008 | Pietri | G05F 3/245 327/543 |
| 2017/0178734 | A1 * | 6/2017 | Pasotti | G11C 16/10 |
| 2018/0101190 | A1 * | 4/2018 | Lee | G05F 3/262 |
| 2019/0101948 | A1 * | 4/2019 | Eberlein | G05F 3/225 |
| 2019/0131863 | A1 * | 5/2019 | El Markhi | H02M 3/156 |
| 2020/0073430 | A1 * | 3/2020 | Panja | G05F 3/267 |
| 2021/0157351 | A1 | 5/2021 | Kang et al. | |
| 2022/0307912 | A1 * | 9/2022 | Karunasiri | A61B 5/686 |
| 2023/0229185 | A1 * | 7/2023 | Jung | G05F 3/20 327/530 |

FOREIGN PATENT DOCUMENTS

| | | | | |
|---|---|---|---|---|
| CN | 112859996 | | | 5/2021 |
| CN | 112925375 | | | 6/2021 |
| CN | 114415776 | | | 4/2022 |
| CN | 114690830 | | | 7/2022 |
| JP | 5970993 | | | 8/2016 |
| JP | 2017126280 | A | * | 7/2017 |
| TW | 202141478 | | | 11/2021 |

* cited by examiner

VOLTAGE REFERENCE CIRCUIT BASED ON TEMPERATURE-SENSITIVE DEVICES HAVING OPPOSITE TEMPERATURE COEFFICIENTS

CROSS-REFERENCE TO RELATED APPLICATIONS

This application claims the benefit of U.S. Provisional Application No. 63/495,192, filed Apr. 10, 2023, and U.S. Provisional Application No. 63/502,759, filed May 17, 2023, each of which is hereby incorporated by reference in its entirety.

BACKGROUND

The recent trend in miniaturizing integrated circuits (ICs) has resulted in smaller devices which consume less power yet provide more functionality at higher speeds. The miniaturization process has also resulted in stricter design and manufacturing specifications as well as reliability challenges. Various electronic design automation (EDA) tools generate, optimize and verify standard cell layout designs for integrated circuits while ensuring that the standard cell layout design and manufacturing specifications are met.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
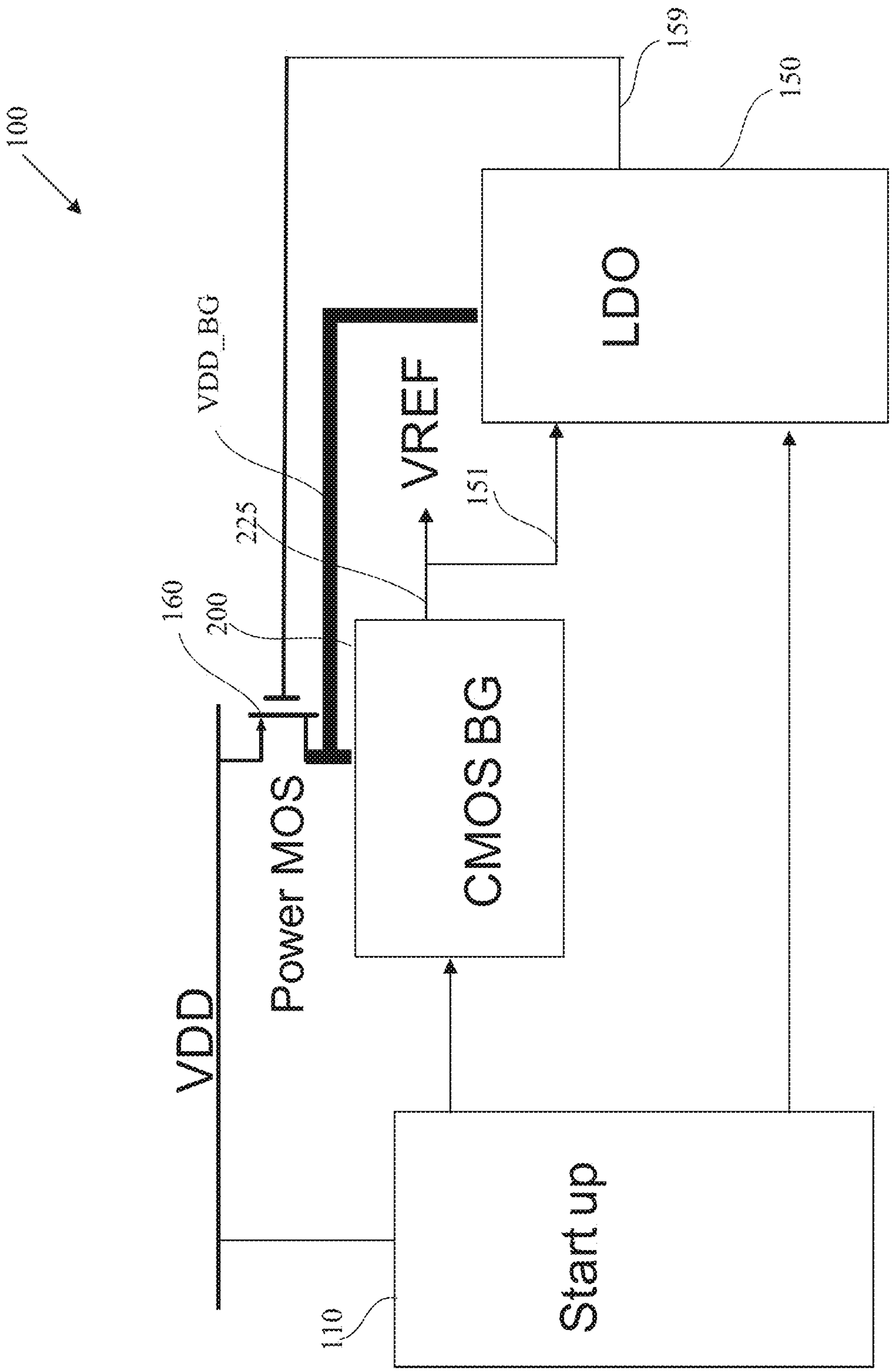
FIG. 1A is a block diagram of a power supply circuit implemented with a voltage reference circuit and a low-dropout regulator ("LDO regulator"), in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In some embodiments, a voltage reference circuit is implemented with a first temperature-sensitive device and a second temperature-sensitive device to generate a reference voltage based on field-effect transistors ("FETs"). The first temperature-sensitive device is implemented to generate a first voltage which monotonically increases with an absolute temperature. The second temperature-sensitive device is implemented to generate a second voltage which monotonically decreases with the absolute temperature. The reference voltage is generated based on the summation of the first voltage from the first temperature-sensitive device and the second voltage from the second temperature-sensitive device. The temperature coefficients of the first temperature-sensitive device and the second temperature-sensitive device are adjusted to reduce the temperature-dependency of the reference voltage generated.

In some embodiments, the reference voltage is applied to an input of a low-dropout regulator ("LDO regulator") to control a power regulating transistor in a power supply circuit to generate a second supply voltage. In response to the temperature-dependency of the reference voltage being reduced, the temperature-dependency of second supply voltage is also consequently reduced. In some embodiments, the reference voltage received by the LDO regulator is generated from a voltage reference circuit which is implemented with transistors having different thresholds. In some embodiments, the reference voltage received by the LDO regulator is generated from a voltage reference circuit based on stacked gate devices.

FIG. 1A is a block diagram of a power supply circuit implemented with a voltage reference circuit and a low-dropout regulator ("LDO regulator"), in accordance with some embodiments. In FIG. 1A, the power supply circuit 100 includes a voltage reference circuit 200, an LDO regulator 150, and a power regulating transistor 160. The power supply circuit 100 also includes a startup circuit 110 which provides various control signals to the voltage reference circuit 200 and the LDO regulator 150. In FIG. 1A, the input 151 of the LDO regulator 150 is configured to receive a reference voltage VREF from the voltage reference circuit 200. The output 159 of the LDO regulator 150 is configured to generate a gate control voltage which is applied to the gate terminal of the power regulating transistor 160. The gate control voltage at the output 159 of the LDO regulator 150 depends upon the reference voltage VREF at the input 151 of the LDO regulator 150 received from the voltage reference circuit 200. Each of the voltage reference circuit 200 and the LDO regulator 150 receives a supply voltage VDD_BG. The difference between the supply voltage VDD and the supply voltage VDD_BG is determined by the drain-to-source voltage difference of the power regulating transistor 160, which is regulated by the gate control voltage generated by the LDO regulator 150 based on the reference voltage VREF received from the voltage reference circuit 200. An example implementation of the voltage reference circuit 200 in FIG. 1A is depicted in FIG. 2A.

Figure 2A:
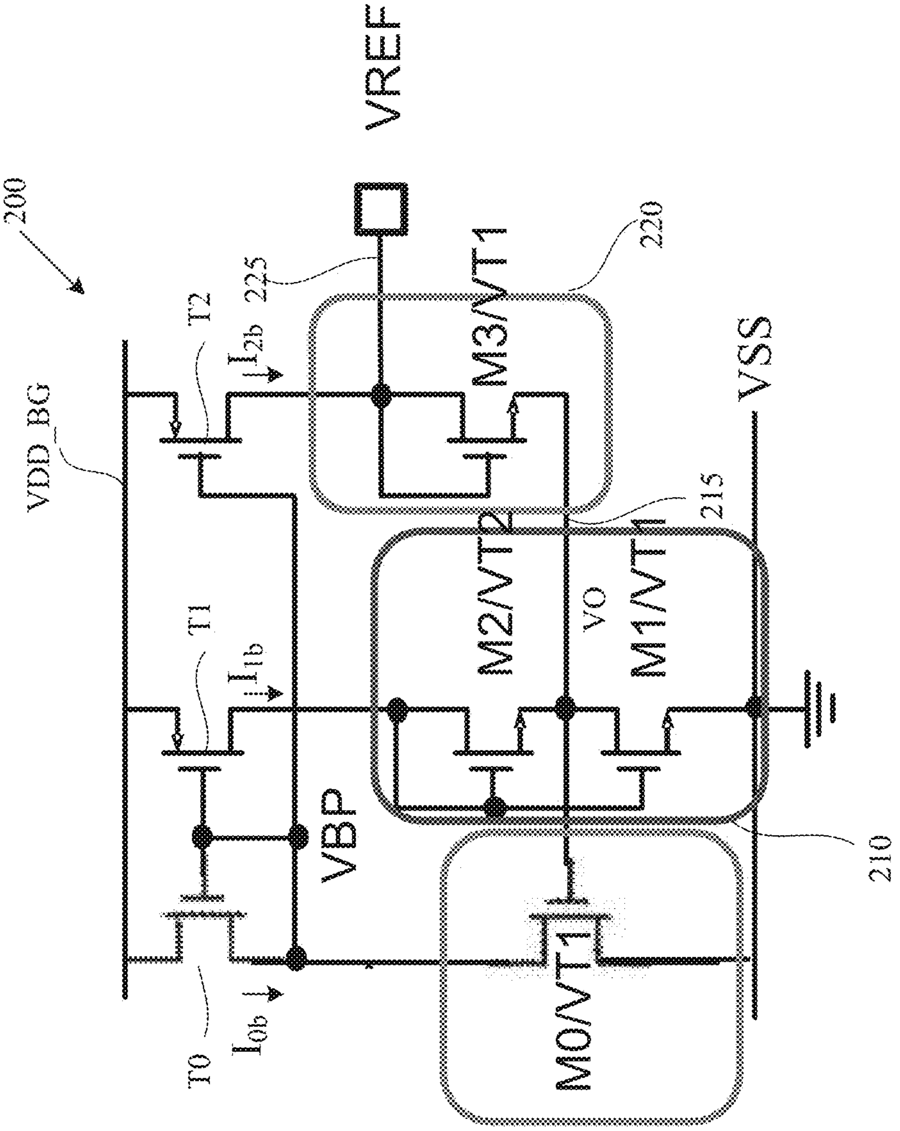
FIG. 2A is a circuit diagram of a voltage reference circuit implemented to generate a reference voltage based on field-effect transistors ("FETs"), in accordance with some embodiments.

FIG. 2A is a circuit diagram of a voltage reference circuit 200 implemented to generate a reference voltage based on field-effect transistors ("FETs"), in accordance with some embodiments. In FIG. 2A, the voltage reference circuit 200 includes field-effect transistors ("FETs") T0, T1, T2, and M0. Each of the FETs has a gate terminal and a channel between a source terminal and a drain terminal. The channel current passing through the channel depends upon the voltage applied to the gate terminal. A transconductance of an FET is a ratio between a small change of the channel current and a small change of the gate-to-source voltage, where the small change of the channel current is induced by the small change of the gate-to-source voltage as the drain-to-source voltage of the FET is maintained constant.

The voltage reference circuit 200 also includes transistors M1, M2, and M3. The transistors M1 and M2 form a temperature-sensitive device 210 and the transistor M3 form a temperature-sensitive device 220. The transistor M1 has a first threshold VT1, but the transistor M2 has a second threshold VT2. The temperature-sensitive device 210 formed with the transistors M1 and M2 has an upward slope in the V-T curve as the voltage VO at the node 115 is plotted with respect to the temperature. The temperature-sensitive device 220 has a downward slope in the V-T curve as the drain-to-source voltage of the transistor M3 is plotted with respect to the temperature.

In FIG. 2A, the channels of the FET T0 and FET M0 are connected in series between a supply voltage VDD_BG and a common voltage VSS. The gate terminals of the FETs T0, T1, and T2 are connected together. Additionally, the channel of the FET T1 is connected between the supply voltage VDD_BG and the drain terminal of the transistor M2. The channel of the transistor M1 is connected between the source terminal of the transistor M2 and the common voltage VSS. The gates of the transistor M1 and the transistor M2 are all connected to the drain terminal of the transistor M2. Furthermore, the channel of the FET T2 is connected between the supply voltage VDD_BG and the drain terminal of the transistor M3. The gate of the transistor M3 is connected to the drain terminal of the transistor M3. The source of the transistor M3 and the source of the transistor M2 are both connected to the gate terminal of the FET M0.

The transistor M2 and the transistor M1 form a temperature-sensitive device 210. The voltage at the node 215 connecting the source terminal of the transistor M2 and the drain terminal of the transistor M1 is the voltage generated by the temperature-sensitive device 210. The generated voltage monotonically increases with an absolute temperature. In some embodiments, the temperature-sensitive device 210 is a PTAT device configured to generate a voltage which is proportional to the absolute temperature ("PTAT").

The transistor M3 forms a temperature-sensitive device 220. The voltage generated by the temperature-sensitive device 220 monotonically decreases with the absolute temperature. In some embodiments, the temperature-sensitive device 220 is a CTAT device configured to generate a voltage which is complementary to the absolute temperature ("CTAT"). In FIG. 2A, the voltage generated by the temperature-sensitive device 220 is the voltage difference between the drain terminal of the transistor M3 and the source terminal of the transistor M3.

The FET T0 and FET T1 are configured to function as a first current mirror device such that the current I1*b* passing through the channel of the FET T1 is proportional to the current I0*b* passing through the channel of the FET T0. When the FET T0 and FET T1 are designed with identical electrical characteristics (such as, same gate width, same threshold, and same transconductance), the current I1*b* in the channel of the FET T1 is equal to the current I0*b* in the channel of the FET T0. The FET T1 functions as a current source, and the current I1*b* flowing through the channel of the FET T1 is injected into the drain terminal of the transistor M2.

The FET T0 and FET T2 are configured to function as a second current mirror device such that the current I2*b* passing through the channel of the FET T2 is proportional to the current I0*b* passing through the channel of the FET T0. When the FET T0 and FET T2 are designed with identical electrical characteristics (such as, same gate width, same threshold, and same transconductance), the current I2*b* in the channel of the FET T2 is equal to the current I0*b* in the channel of the FET T0. The FET T2 functions as a current source, and the current I2*b* flowing through the channel of the FET T2 is injected into the drain terminal of the transistor M3.

While each of the current I1*b* in the channel of the FET T1 and the current I2*b* in the channel of the FET T2 is determined by the current I0*b* in the channel of the FET T0, the current I0*b* is determined by the gate-to-source voltage applied to the gate terminal of the FET M0. In FIG. 2A, the gate terminal of the FET M0 is connected to the node 215. As the voltage at the node 215 is applied to the gate terminal of the FET M0, a negative feedback loop is completed. In responsive to an increase of the current I0*b* in the channel of the FET T0, each of the current I1*b* in the channel of the FET T1 and the current I2*b* in the channel of the FET T2 increases as well, which induces a voltage reduction at the node 215 and at the gate terminal of the FET M0. The voltage reduction at the gate terminal of the FET M0 further induces a current reduction of the current I0*b* in the channel of the FET T0. Consequently, fluctuations of the current I0*b*, the current I1*b*, the current I2*b*, and the voltage at the node 215 are all reduced because of the negative feedback.

Figure 2B:
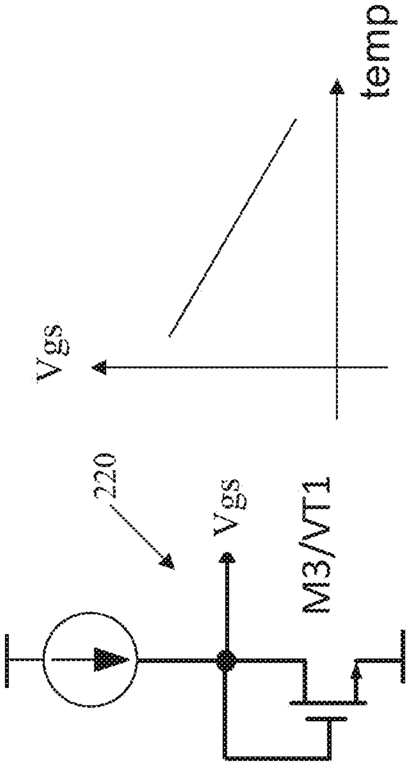
FIG. 2B is a voltage-temperature curve of a temperature-sensitive device implemented with a FET, in accordance with some embodiments.

In FIG. 2B, the temperature-sensitive device 220 is a CTAT device which is implemented with a transistor M3. The downward slope of the voltage-temperature curve ("V-T curve") in FIG. 2B, as the absolute value of temperature coefficient dV/dT, depends upon the threshold of the transistor M3. In some embodiments, the downward slope of the V-T curve of the transistor M3 is adjusted by changing the threshold of the transistor M3.

Figure 2C:
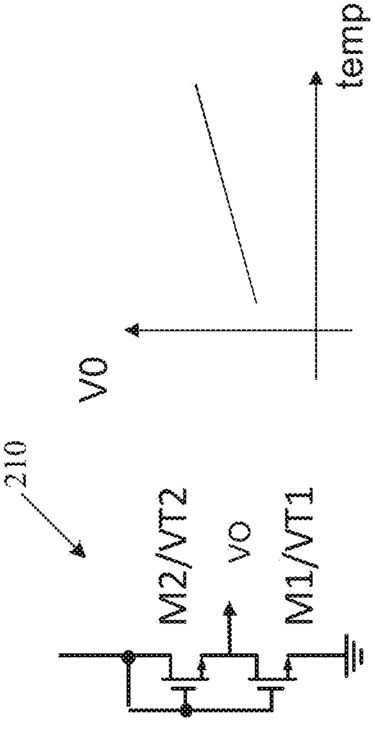
FIG. 2C is a voltage-temperature curve of a temperature-sensitive device implemented with two FETs connected in series, in accordance with some embodiments.

In FIG. 2C, the temperature-sensitive device 210 is a PTAT device which is implemented with the transistor M2 and the transistor M1. Each of the drain-to-source voltage of the transistor M2 and the drain-to-source voltage of the transistor M1 decreases in response to a rising temperature.

In some implementations, the voltage VO generated by the temperature-sensitive device 210 at the node 215 increases in response to a rising temperature, under the condition that the threshold of the transistor M2 is smaller than the threshold of the transistor M1.

In FIG. 2A, the temperature-sensitive device 210 formed with the transistors M1 and M2 has an upward slope in the V-T curve as the voltage VO at the node 215 is plotted with respect to the temperature. The temperature-sensitive device 220 has a downward slope in the V-T curve as the drain-to-source voltage of the transistor M3 is plotted with respect to the temperature. As the voltage VO at the output of the temperature-sensitive device 210 is added to the drain-to-source voltage of the transistor M3 in the temperature-sensitive device 220, the temperature dependency of the output voltage VREF at the output terminal 225 of the voltage reference circuit 200 is reduced.

In the temperature-sensitive device 210, the threshold of the transistor M1 is larger than the threshold of the transistor M2. In some embodiments, the transistor M1 is designed as a standard threshold device ("SVT device"), while the transistor M2 is designed as a low threshold device ("LVT device"), as an ultra-low threshold device ("ULVT device"), or as an extreme low threshold device ("ELVT device"). In some embodiments, the transistor M1 is designed as an LVT device, while the transistor M2 is designed as a ULVT device or an ELVT device. In some embodiments, the transistor M1 is designed as a ULVT device, while the transistor M2 is designed as an ELVT device. In the temperature-sensitive device 220, the transistor M3 is designed as an SVT device, an LVT device, a ULVT device, or an ELVT device.

In some embodiments, the transistor M0 in the channel current path of the FET T0 is designed with a same threshold as the threshold of the transistor M3 in the temperature-sensitive device 220. For example, in some embodiments, each of the transistor M0 and transistor M3 is designed as an SVT device. In some embodiments, each of the transistor M0 and transistor M3 is designed as an LVT device. In some embodiments, the channel width of the transistor M0 and the channel width of the transistor M3 are designed to be equal; the ratio between the channel width of the transistor M0 and the channel width of the transistor M3 is 1:1. In some embodiments, the ratio between the channel width of the transistor M0 and the channel width of the transistor M3 is 1:N, where N is a positive integer.

Figure 1B:
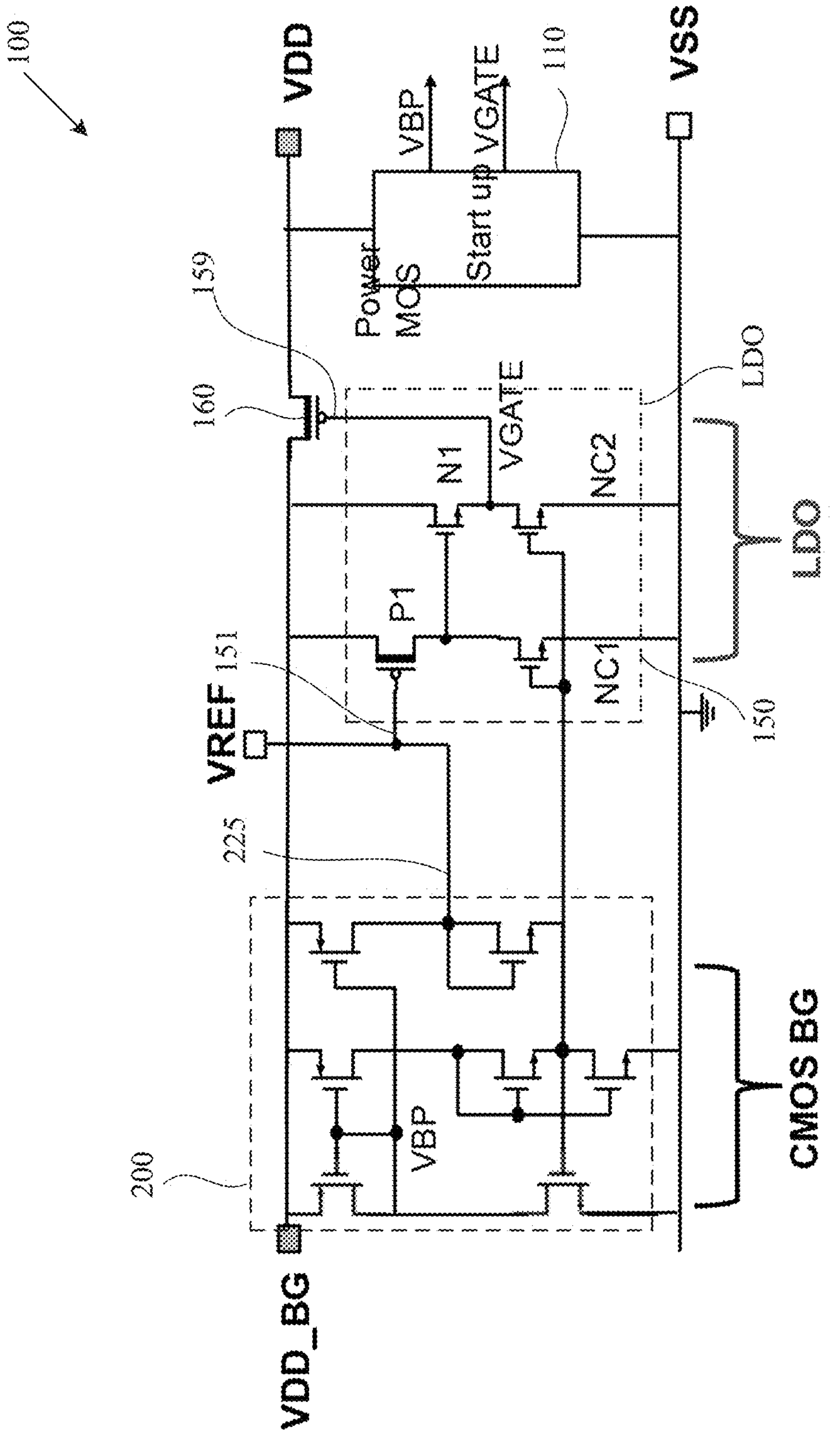
FIG. 1B is a circuit diagram of an example implementation of the power supply circuit in FIG. 1A.

FIG. 1B is a circuit diagram of an example implementation of the power supply circuit in FIG. 1A. In FIG. 1B, example implementations of the LDO regulator 150 and the voltage reference circuit 200 are provided. Other implementations of the LDO regulator 150 or the voltage reference circuit 200 are within the contemplated scope of the present disclosure.

In FIG. 1B, the voltage reference circuit is implemented with the voltage reference circuit 200 of FIG. 2A, and the LDO regulator 150 is implemented with voltage followers. The transistors P1 and NC1 form a first voltage follower, and the transistors N1 and NC2 form a second voltage follower. The gate terminal of the transistor P1 is configured to receive the reference voltage VREF from the voltage reference circuit 200. A small change of the reference voltage VREF induces an equal amount of voltage change at the gate terminal of the transistor N1, which further induces an equal amount of voltage change at the output 159 of the LDO regulator 150. The smaller the change in the reference voltage VREF, the smaller the induced change in the voltage VGATE at the gate terminal of power regulating transistor 160, and the smaller the induced change in the voltage difference between the supply voltage VDD and the supply voltage VDD_BG. That is, a smaller temperature coefficient |dVREF/dT| of the reference voltage VREF corresponds to a smaller temperature coefficient of the voltage difference |VDD−VDD_BG|.

In FIG. 1B, the startup circuit 110 is implemented to output a control signal VBP and a control signal VGATE. The control signal VBP is coupled to node VBP in the voltage reference circuit 200 to control the channel currents in each of the transistors T0, T1 and T2 (which are shown in FIG. 1A). The control signal VGATE is coupled to the gate terminal of power regulating transistor 160 to directly control the voltage difference between the supply voltage VDD and the supply voltage VDD_BG.

In some embodiments, the supply voltage VDD_BG is sampled with a voltage divider to generate an output-sensing voltage which is then compared with the reference voltage VREF. The output-sensing voltage and the reference voltage VREF are coupled to differential inputs of a LDO regulator, which results in a voltage VGATE at the output of the LDO regulator which depends upon the difference between the output-sensing voltage and the reference voltage VREF. As the voltage VGATE is coupled to the gate terminal of power regulating transistor 160, a feedback loop is completed for controlling the supply voltage VDD_BG.

Figure 3A:
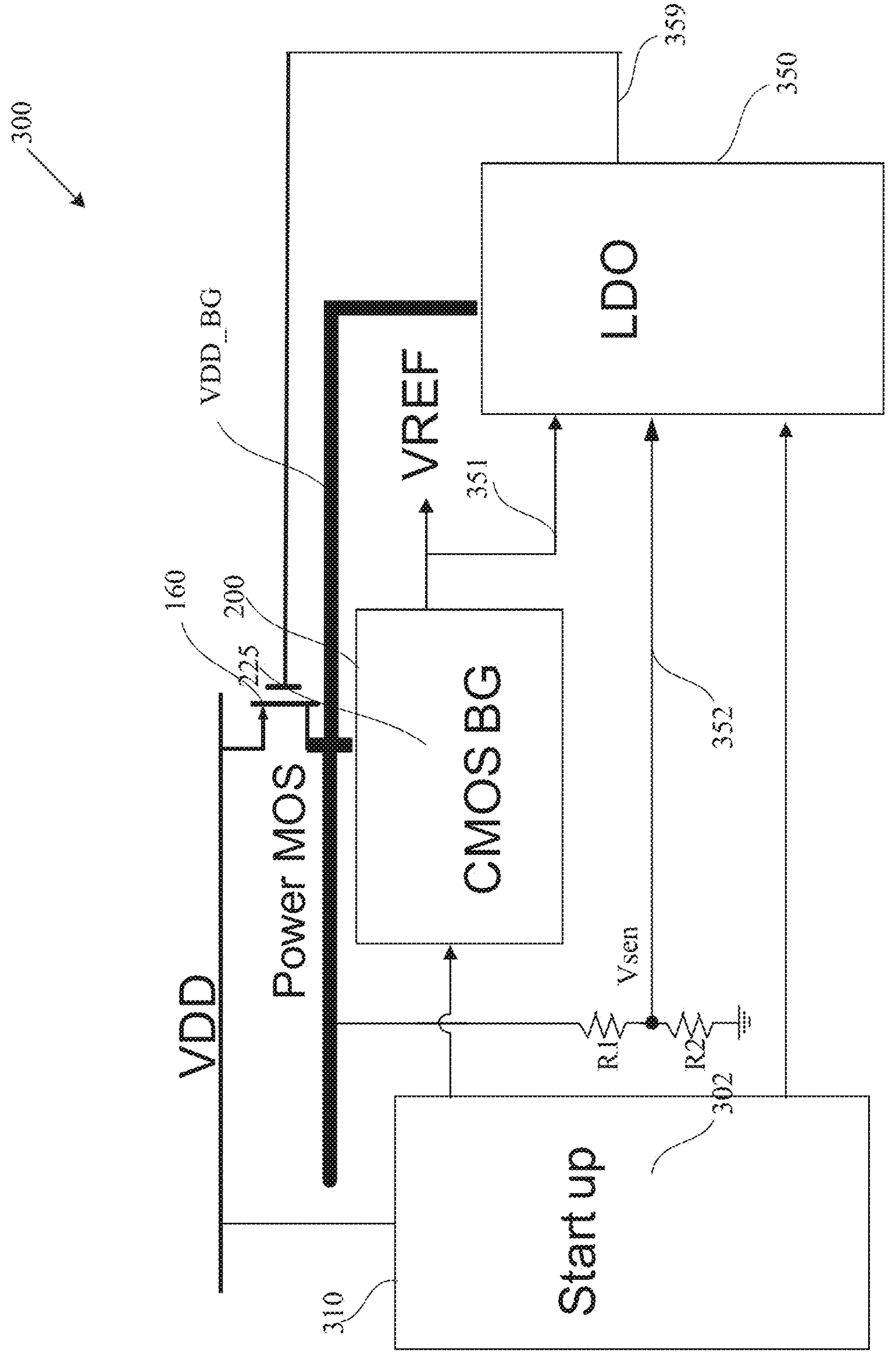
FIG. 3A is a block diagram of a power supply circuit implemented with a voltage reference circuit and an LDO regulator in a feedback loop, in accordance with some embodiments.

FIG. 3A is a block diagram of a power supply circuit implemented with a voltage reference circuit and an LDO regulator in a feedback loop, in accordance with some embodiments. In FIG. 3A, the power supply circuit 300 includes a voltage reference circuit 200, an LDO regulator 350, and a power regulating transistor 160. Each of the voltage reference circuit 200 and the LDO regulator 350 is configured to receive the supply voltage VDD_BG. The power supply circuit 300 also includes a startup circuit 310 which provides various control signals to the voltage reference circuit 200 and the LDO regulator 350.

Similar to the power supply circuit 100, various implementations of the voltage reference circuit 200 in the power supply circuit 300 are possible. Example implementations of the voltage reference circuit 200 include the voltage reference circuit 200 of FIG. 2A. The power supply circuit 300 of FIG. 3A also similarly includes a startup circuit 310 which provides various control signals to the voltage reference circuit 200 and the LDO regulator 350. In the power supply circuit 300 of FIG. 3A, however, the LDO regulator 350 is different from the LDO regulator 150 in FIG. 1A. The LDO regulator 350 includes a first input 351 and a second input 352. The gate control voltage VGATE at the output 359 of the LDO regulator 350 depends upon the difference between the voltage applied to the first input 351 and the voltage applied to a second input 352.

In FIG. 3A, the first input 351 of the LDO regulator 350 is configured to receive a reference voltage VREF from the voltage reference circuit 200, and the second input 352 of the LDO regulator 350 is configured to receive an output-sensing voltage Vsens from a voltage divider. The voltage divider includes two resistors R1 and R2 connected in series between the supply voltage VDD_BG and the common voltage VSS. The output-sensing voltage Vsens at the node 302 of the voltage divider is proportional to the voltage difference between the supply voltage VDD_BG and the common voltage VSS, as given by the equation Vsens=(VDD_BG−VSS)*R2/(R1+R2). The gate control voltage VGATE at the output 359 of the LDO regulator 350 depends upon the voltage difference between the output-sensing voltage Vsens and the reference voltage VREF. The control voltage VGATE is applied to the gate terminal of the power regulating transistor 160 to regulate the drain-to-source voltage difference of the power regulating transistor 160. Consequently, the supply voltage VDD is regulated in a negative feedback loop by the LDO regulator 350, based on the voltage difference between the output-sensing voltage Vsens and the reference voltage VREF.

Figure 3B:
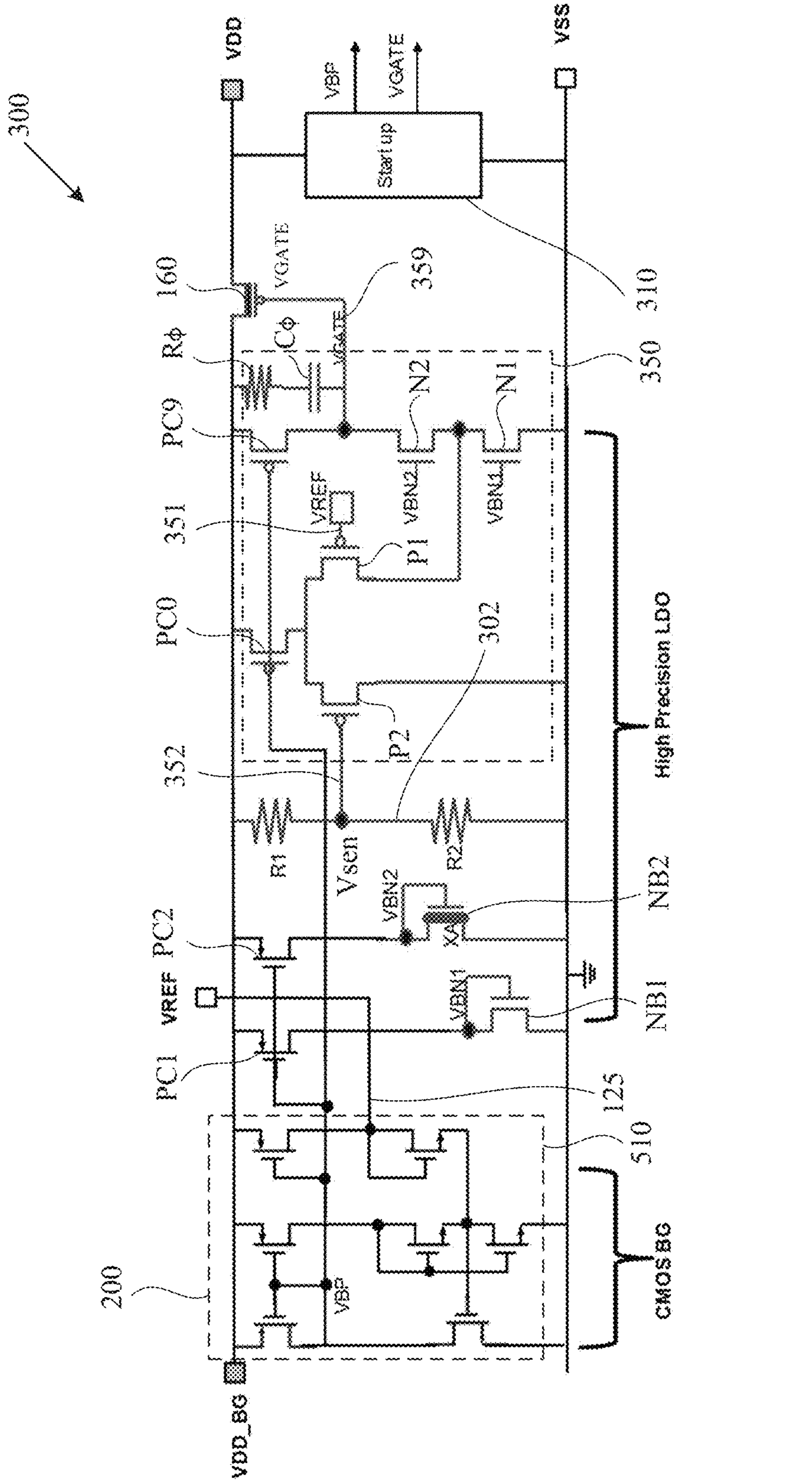
FIG. 3B is a circuit diagram of an example implementation of the power supply circuit in FIG. 3A.

FIG. 3B is a circuit diagram of an example implementation of the power supply circuit in FIG. 3A. In FIG. 3B, example implementations of the LDO regulator 350 and the voltage reference circuit 200 are provided. Other implementations of the LDO regulator 350 or the voltage reference circuit 200 are within the contemplated scope of the present disclosure.

In FIG. 3B, the voltage reference circuit is implemented with the voltage reference circuit 200 of FIG. 2A, and the LDO regulator 350 is implemented with a differential amplifier. The differential amplifier in the LDO regulator 350 includes an input stage implemented with transistors P1, P2, and PC0 and an output stage implemented with transistors N1, N2, and PC9. The gate terminal of the transistor P1 is configured as the first input 351 to receive the reference voltage VREF from the voltage reference circuit 200. The gate terminal of the transistor P2 is configured as the second input 352 to receive the output-sensing voltage Vsens from the voltage divider. The conducting node between the drain terminal of the transistor PC9 and the drain terminal of transistor N2 is configured as the output 359 to generate the control voltage VGATE which is coupled to the gate terminal of the power regulating transistor 160.

The channel of the transistor P1 is connected between the drain terminal of the transistor PC0 and the drain terminal of transistor N1. The channel of the transistor P2 is connected between the drain terminal of the transistor PC0 and the common voltage VSS. The channels of the transistor N1 and the transistor N2 are connected in series between the drain terminal of the transistor PC9 and the common voltage VSS. The source terminals of the transistors PC0 and PC9 are connected to the supply voltage VDD_BG. The gate terminals of the transistors PC0 and PC9 are connected to the node VBP in the voltage reference circuit 200, and hence the channel conductivity of the transistor PC0 and the channel conductivity of the transistor PC9 are both controlled by the voltage at the node VBP. The gate terminals of the transistors PC1 and PC2 are also connected to the node VBP in the voltage reference circuit 200, and hence the channel conductivity of the transistor PC1 and the channel conductivity of the transistor PC2 are also controlled by the voltage at the node VBP.

The drain terminal of the transistor PC1 is connected to both the drain terminal and the gate terminal of the transistor NB1, which forms a first bias circuit. The drain terminal of the transistor PC2 is connected to both the drain terminal and the gate terminal of the transistor NB2, which forms a second bias circuit. The bias voltage VBN1 generated by the first bias circuit at the drain terminal of the transistor NB1 is coupled to the gate terminal of the transistor N1 in the output stage of the LDO regulator 350. The bias voltage VBN2 generated by the second bias circuit at the drain terminal of the transistor NB2 is coupled to the gate terminal of the transistor N2 in the output stage of the LDO regulator 350.

In FIG. 3B, a phase compensation circuit is implemented to improve the stability and the speed of the feedback loop. The phase compensation circuit in FIG. 3B includes a resistor $R_{\Phi}$ and a capacitor $C_{\Phi}$ connected in series between the supply voltage VDD_BG and the gate terminal of the power regulating transistor 160. The selections of the resistor $R_{\Phi}$ and the capacitor $C_{\Phi}$ depend upon the transfer function of the LDO regulator 350 and the frequency response of the power regulating transistor 160. Other implantations of the phase compensation circuit for the feedback loop are within the contemplated scope of the present disclosure. In some implantations, the phase compensation circuit is configured to construct a loop transfer function that has more than one pole or more than one zero.

Figure 4:
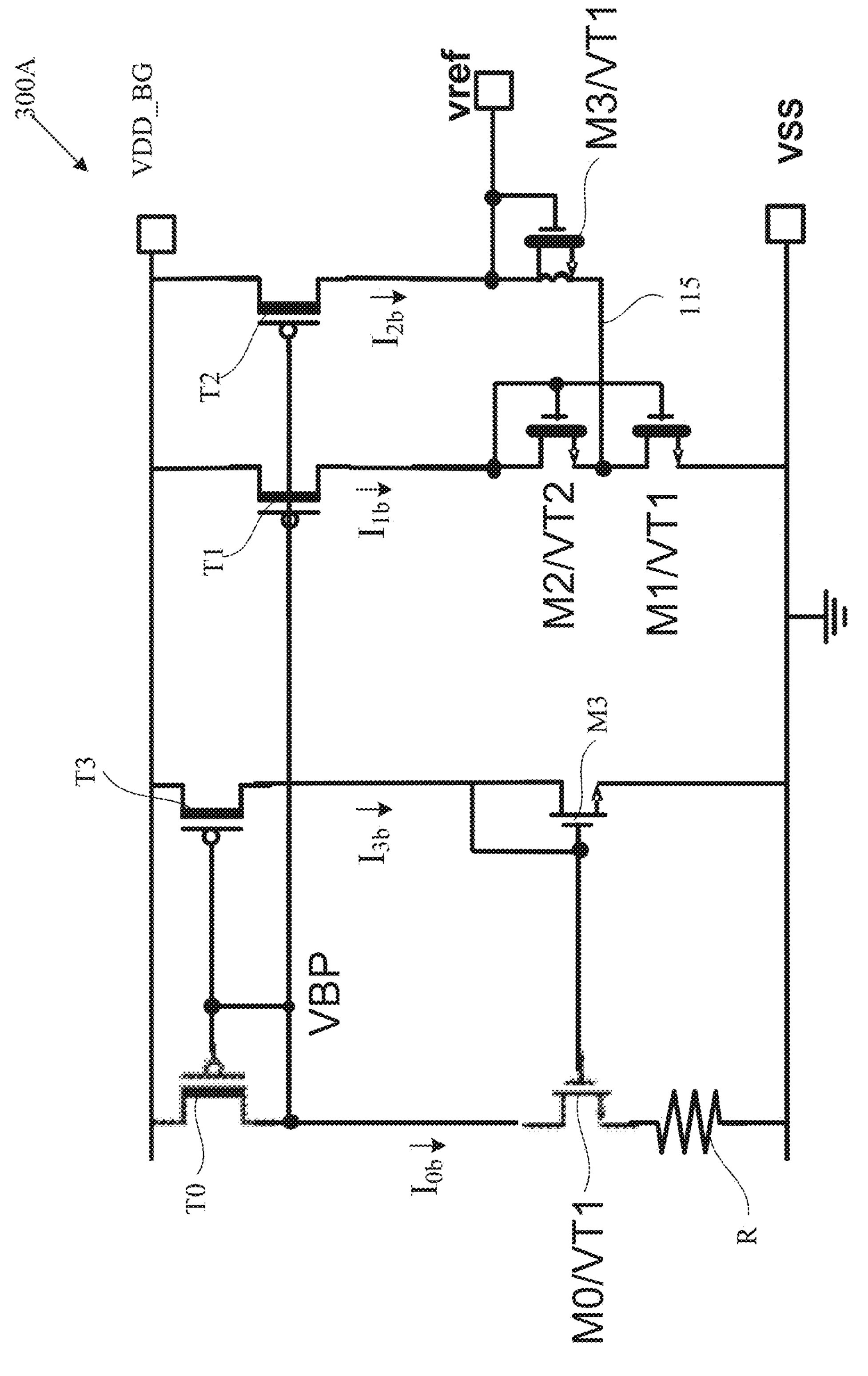
FIG. 4 is a circuit diagram of a voltage reference circuit implemented with FETs, in accordance with some embodiments.

Additional embodiments of integrated circuits to generate a reference voltage are depicted in circuit diagrams of FIG. 4. The voltage reference circuit 400 in FIG. 4 is modified from the voltage reference circuit 200 in FIG. 2A. The modification includes adding a FET T3, a FET M3, and a resistor R to the voltage reference circuit 400 in FIG. 4. The channels of the FET T3 and FET M3 are connected in series between the supply voltage VDD_BG and the common voltage VSS. The gate terminal of the FET T3 is connected to the gate terminal of the FET T0. The channels of the FET T0 and FET M0 and the resistor R are all connected in series between the supply voltage VDD_BG and the common voltage VSS. The gate terminal of the FET M3 is connected to both the drain terminal of the FET M3 and the gate terminal of the FET M0.

The FET T0 and the FET T3 are configured to function as a third current mirror device such that the current I3*b* passing through the channel of the FET T3 is proportional to the current I0*b* passing through the channel of the FET T0. When the FET T0 and FET T3 are designed with identical electrical characteristics (such as, same gate width, same threshold, and same transconductance), the current I3*b* in the channel of the FET T3 is equal to the current I0*b* in the channel of the FET T0. The current I3*b* flowing through the channel of the FET T3 is injected into the drain terminal of the FET M3. The voltage at the drain terminal of the FET M3 is applied to the gate terminal of the FET M0, which completes a negative feedback loop. The resistor R connected between the source terminal of the FET M0 and the common voltage VSS also provides a negative feedback with improve stability. Specifically, in response to the current I0*b* in the channel of the FET T0 increasing, the voltage drop across the resistor R increases, the voltage at the source of terminal of the FET M0 decreases, which tends to reduce the gate-to-source voltage of the FET M0 and hence tends to reduce the current I0*b*.

In the power supply circuits 100 and 300, the temperature coefficient of the supply voltage VDD (which is the absolute value of the derivative dVDD/dT) depends upon the temperature coefficient of the reference voltage VREF (which is the absolute value of the derivative dVREF/dT) generated by a voltage reference circuit (such as the voltage reference circuit 200). The voltage reference circuit 200 of FIG. 2A or the voltage reference circuit 400 of FIG. 4 is implemented to reduce the temperature coefficient of the reference voltage VREF, which consequently reduces the temperature coefficient of the supply voltage VDD in the power supply circuits 100 and 300. Additionally, as the power supply circuits 100 and 300 are implemented with a LDO regulator coupled to a power regulating transistor, a supply voltage VDD within a desired voltage range (e.g., 1.5V-5V) is achievable, even if the reference voltage VREF generated by the voltage reference circuit has a voltage (e.g., 0.1V-0.2V) which is much lower than the supply voltage VDD.

Figure 5A:
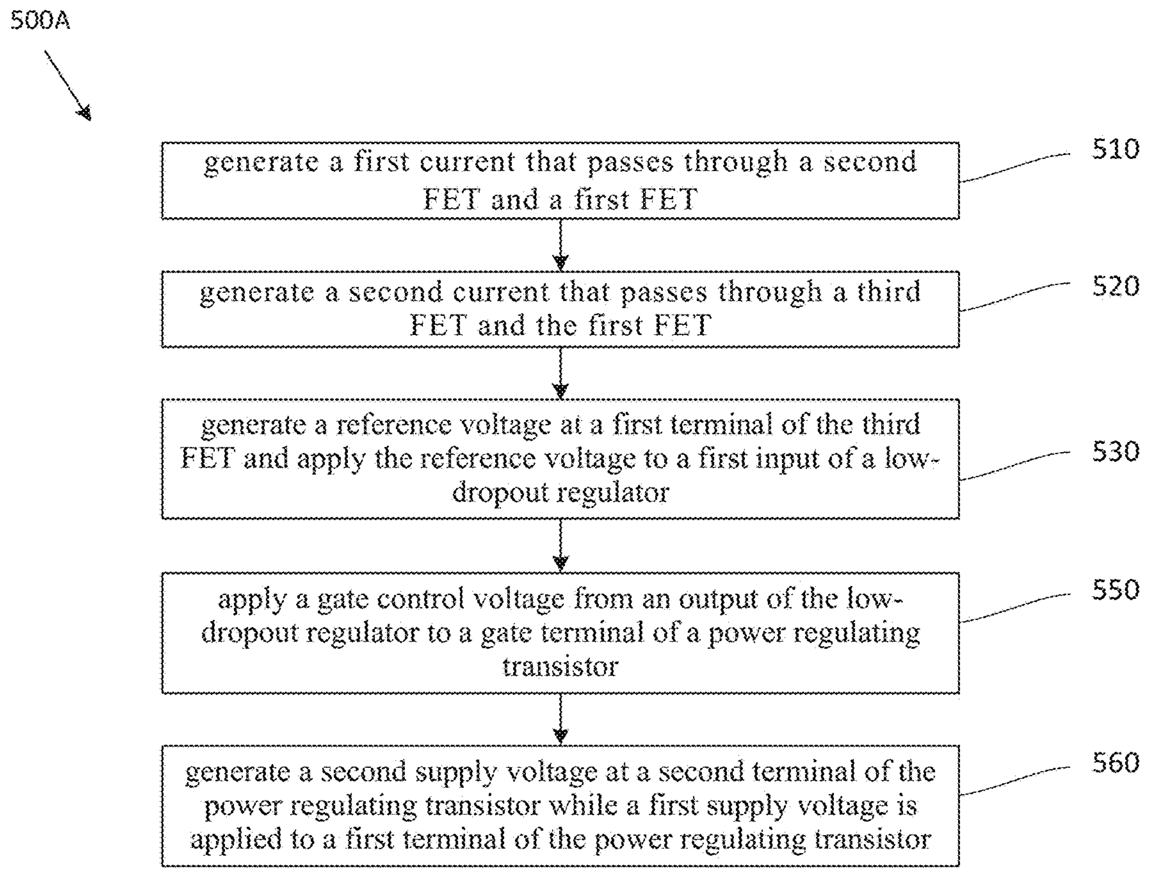
FIGS. 5A-5B are flowcharts of methods of generating a second supply voltage with reduced temperature-dependency, in accordance with some embodiments.
Figure 5B:
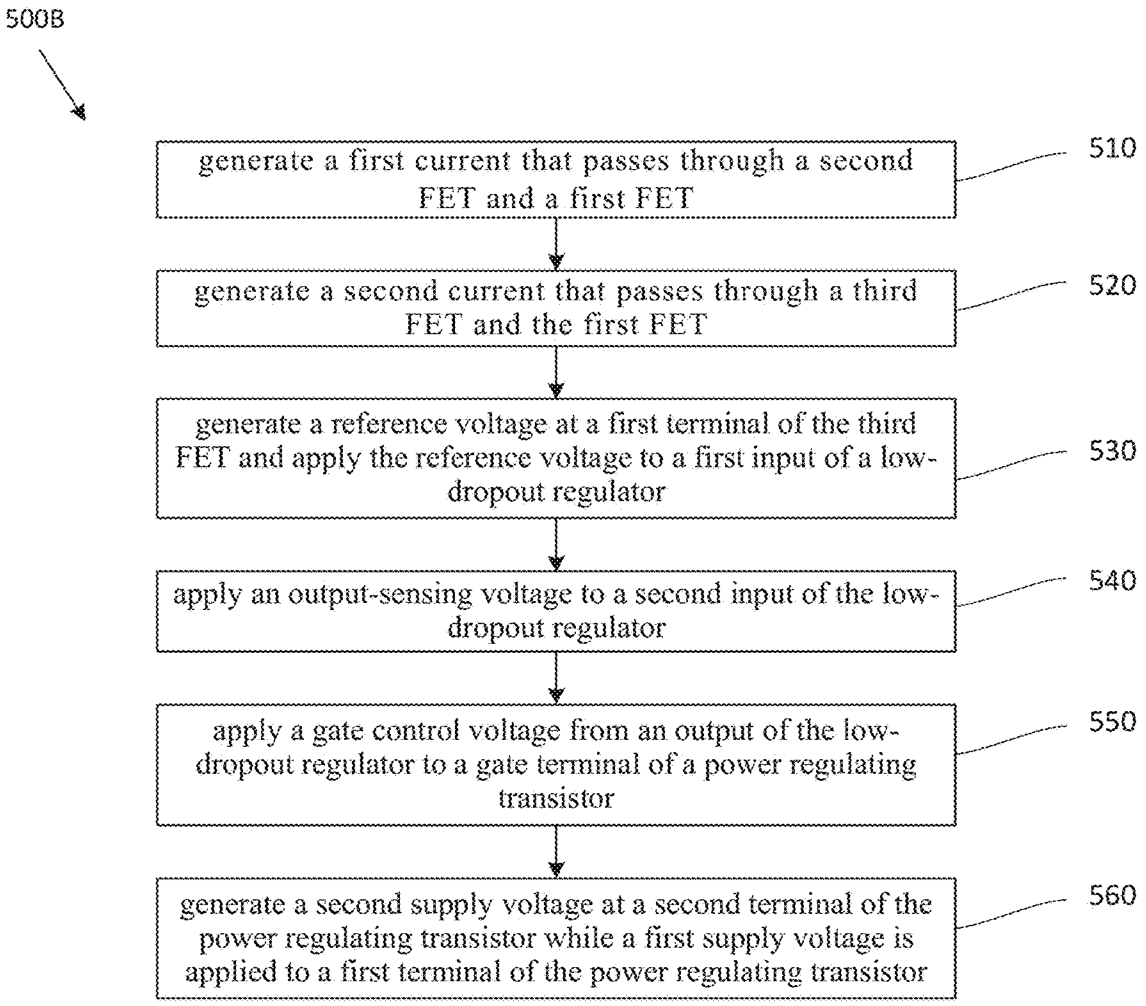

FIGS. 5A-5B are flowcharts of a method 500A and a method 500B of generating a second supply voltage with reduced temperature-dependency, in accordance with some embodiments. The sequence in which the operations of method 500A or method 500B are depicted in FIGS. 5A-5B are for illustration only; the operations of method 500A or method 500B are capable of being executed in sequences that differ from that depicted in FIGS. 5A-5B. It is understood that additional operations may be performed before, during, and/or after the method 500A or the method 500B depicted in FIGS. 5A-5B, and that some other processes may only be briefly described herein. The method 500A in FIG. 5A includes operations 510, 520, 530, 550, and 560. The method 500B in FIG. 5B includes operations 510, 520, 530, 540, 550, and 560.

In operation 510 of methods 500A and 500B, a first current is generated to pass through a second FET and a first FET. In the embodiments as shown in FIG. 2A and FIG. 4, the current I1*b* in the channel of the FET T1 is generated, and the current I1*b* passes through the FET M2 and the FET M1.

In operation 520 of methods 500A and 500B, a second current is generated to pass through a third FET and the first FET. In the embodiments as shown in FIG. 2A and FIG. 4, the current I2*b* in the channel of the FET T1 is generated, and the current I2*b* passes through the FET M3 and the FET M1.

In operation 530, a reference voltage generated at a terminal of the third FET is applied to a first input of a low-dropout regulator. In the embodiments as shown in FIGS. 1A-1B, a reference voltage VREF from the output terminal 225 of the voltage reference circuit 200 is applied to the input 151 of the LDO regulator 150. In the embodiments as shown in FIGS. 3A-3B, a reference voltage VREF from the output terminal 225 of the voltage reference circuit 200 is applied to the first input 351 of the LDO regulator 350.

In operation 540 of method 500B, an output-sensing voltage is applied to a second input of the low-dropout regulator. The output-sensing voltage depends upon the second supply voltage regenerated in operation 560. In the embodiments as shown in FIGS. 3A-3B, an output-sensing voltage Vsens from a voltage divider is coupled to the second input 352 of the LDO regulator 350. Here, the output-sensing voltage Vsens is proportional to the supply voltage VDD.

In operation 550 of methods 500A and 500B, a gate control voltage from an output of the low-dropout regulator is applied to a gate terminal of a power regulating transistor. In the embodiments as shown in FIGS. 1A-1B and FIGS. 3A-3B, the voltage VGATE at the output of the LDO regulator 150 or 350 is coupled to the gate terminal of power regulating transistor 160.

In operation 560 of methods 500A and 500B, a second supply voltage is generated at a second terminal of the power regulating transistor while a first supply voltage is applied to a first terminal of the power regulating transistor. In the embodiments as shown in FIGS. 1A-1B and FIGS. 3A-3B, the supply voltage VDD is generated at a second terminal of the power regulating transistor 160 while a supply voltage VDD_BG is applied to a first terminal of the power regulating transistor 160.

An aspect of the present disclosure relates to an integrated circuit. The integrated circuit includes a first temperature-sensitive device, a second temperature-sensitive device, an output terminal, a power regulating transistor, and a low-dropout regulator. The first temperature-sensitive device is configured to generate a first voltage which monotonically increases with an absolute temperature. The second temperature-sensitive device is configured to generate a second voltage which monotonically decreases with the absolute temperature. The output terminal is configured to generate a reference voltage which is a summation of the first voltage from the first temperature-sensitive device and the second voltage from the second temperature-sensitive device. The power regulating transistor has a gate, a source, a drain, and a channel between the source and the drain. The channel of the power regulating transistor is connected between a first terminal configured to receive a first supply voltage and a second terminal configured to generate a second supply voltage. The low-dropout regulator has a first input connected to the output terminal and has an output connected to the gate of the power regulating transistor.

Another aspect of the present disclosure relates to an integrated circuit. The integrated circuit includes a first FET, a second FET, and a third FET, a first current source, a second current source, a low-dropout regulator, and a power regulating transistor. The first current source is connected to a first terminal of the second FET. The second FET has a second terminal connected to a first terminal of the first FET. The second current source is connected to a first terminal of the third FET. The third FET has a second terminal connected to the first terminal of the first FET. The low-dropout regulator has a first input connected to the first terminal of the third FET. The power regulating transistor has a gate, a source, a drain, and a channel between the source and the drain. The gate of the power regulating transistor is connected to an output of the low-dropout regulator. The channel of the power regulating transistor is connected between a first terminal configured to receive a first supply voltage and a second terminal configured to generate a second supply voltage.

Still another aspect of the present disclosure relates to a method. The method includes generating a first current passing through a second FET and a first FET, generating a second current passing through a third FET and the first FET, generating a reference voltage at a first terminal of the third FET, and outputting the reference voltage to a first input of a low-dropout regulator. The method also includes applying a gate control voltage from an output of the low-dropout regulator to a gate terminal of a power regulating transistor, and generating a second supply voltage at a second terminal of the power regulating transistor while a first supply voltage is applied to a first terminal of the power regulating transistor.

It will be readily seen by one of ordinary skill in the art that one or more of the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. An integrated circuit comprising:

a first temperature-sensitive device configured to generate a first voltage which monotonically increases with an absolute temperature;

a first FET ("Field-Effect Transistor") and a second FET in the first temperature-sensitive device, wherein the second FET has a first terminal thereof connected to a first current source and has a second terminal thereof connected to a first terminal of the first FET;

a second temperature-sensitive device configured to generate a second voltage which monotonically decreases with the absolute temperature;

a third FET in the second temperature-sensitive device, wherein the third FET has a first terminal thereof connected to a second current source and has a second terminal thereof connected to the first terminal of the first FET;

a fourth FET having a gate terminal thereof connected to the first terminal of the first FET without passing through any intervening active element, and wherein the fourth FET is configured to have a channel thereof carry a current which is proportional to a first current generated by the first current source and proportional to a second current generated by the second current source;

an output terminal configured to generate a reference voltage which is a summation of the first voltage from the first temperature-sensitive device and the second voltage from the second temperature-sensitive device;

a power regulating transistor having a gate, a source, a drain, and a channel between the source and the drain, wherein the channel of the power regulating transistor is connected between a first terminal configured to receive a first supply voltage and a second terminal configured to generate a second supply voltage; and a low-dropout regulator having a first input connected to the output terminal and having an output connected to the gate of the power regulating transistor.

2. The integrated circuit of claim 1, wherein the first temperature-sensitive device is a PTAT device configured to generate the first voltage which is proportional to the absolute temperature ("PTAT").

3. The integrated circuit of claim 1, wherein the second temperature-sensitive device is a CTAT device configured to generate the second voltage which is complementary to the absolute temperature ("CTAT").

4. The integrated circuit of claim 1, wherein the low-dropout regulator is a differential amplifier, and the low-dropout regulator has a second input configured to receive an output-sensing voltage which depends upon the second supply voltage at the second terminal.

5. The integrated circuit of claim 1, wherein the first FET has a first threshold and the second FET has a second threshold, and wherein the first threshold is different from the second threshold.

6. The integrated circuit of claim 5, wherein the first threshold of the first FET is larger than the second threshold of the second FET.

7. The integrated circuit of claim 1, wherein a gate terminal of the first FET and a gate terminal of a second FET are connected to the first terminal of the second FET.

8. The integrated circuit of claim 1, wherein the third FET has a third threshold.

9. The integrated circuit of claim 1, wherein a gate terminal of the third FET is connected to the first terminal of the third FET.

10. An integrated circuit comprising:

a first FET, a second FET, a third FET, and a fourth FET;

a first current source connected to a first terminal of the second FET, the second FET having a second terminal connected to a first terminal of the first FET and a gate terminal of the fourth FET without passing through any intervening active element, wherein the first current source is configured to generate a first current which is proportional to a current in a channel of the fourth FET;

a second current source connected to a first terminal of the third FET, the third FET having a second terminal connected to the first terminal of the first FET and the gate terminal of the fourth FET without passing through any intervening active element, wherein the second current source is configured to generate a second current which is proportional to the current in the channel of the fourth FET;

a low-dropout regulator having a first input connected to the first terminal of the third FET; and a power regulating transistor having a gate, a source, a drain, and a channel between the source and the drain, wherein the gate of the power regulating transistor is connected to an output of the low-dropout regulator, and wherein the channel of the power regulating transistor is connected between a first terminal configured to receive a first supply voltage and a second terminal configured to generate a second supply voltage.

11. The integrated circuit of claim 10, wherein the low-dropout regulator is a differential amplifier, and the low-dropout regulator has a second input configured to receive an output-sensing voltage which depends upon the second supply voltage at the second terminal.

12. The integrated circuit of claim 10, wherein a gate terminal of the first FET and a gate terminal of the second FET are connected to the first terminal of the second FET.

13. The integrated circuit of claim 10, wherein a gate terminal of the third FET is connected to the first terminal of the third FET.

14. The integrated circuit of claim 10, wherein the first FET has a first threshold, and the second FET has a second threshold which is different from the first threshold.

15. A method comprising:

generating a first current passing through a first terminal of a second FET;

generating a first voltage at a first terminal of a first FET and at a second terminal of the second FET based on the first current which passes through both the second FET and the first FET;

generating a second current passing through a first terminal of a third FET;

applying the first voltage to a gate terminal of a fourth FET, wherein the fourth FET is configured to have a channel thereof carry a current which is proportional to each of the first current passing through the second FET and the second current passing through the third FET;

applying the first voltage to a second terminal of the third FET; and generating a reference voltage at the first terminal of the third FET based on both the first voltage and the second current which passes through both the third FET and the first FET.

16. The method of claim 15, further comprising:

outputting the reference voltage to a first input of a low-dropout regulator.

17. The method of claim 16, further comprising:

applying a gate control voltage from an output of the low-dropout regulator to a gate terminal of a power regulating transistor.

18. The method of claim 17, further comprising:

generating a second supply voltage at a second terminal of the power regulating transistor while a first supply voltage is applied to a first terminal of the power regulating transistor.

19. The method of claim 18, further comprising:

generating an output-sensing voltage which depends upon the second supply voltage; and applying the output-sensing voltage to a second input of the low-dropout regulator.

20. The method of claim 19, wherein generating the output-sensing voltage comprises:

generating the output-sensing voltage with a voltage divider which has a terminal receiving the second supply voltage.

* * * * *